United States Patent
Kees et al.

(10) Patent No.: US 10,710,466 B2
(45) Date of Patent: Jul. 14, 2020

(54) METHOD AND SYSTEM FOR CHARGING AN ELECTRIC VEHICLE

(71) Applicant: FORD GLOBAL TECHNOLOGIES, LLC, Dearborn, MI (US)

(72) Inventors: Donatus Andreas Josephine Kees, Billericay (GB); Anthemios Philemon Petridis, Bishop's Stortford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 249 days.

(21) Appl. No.: 15/340,817

(22) Filed: Nov. 1, 2016

(65) Prior Publication Data
US 2017/0144559 A1 May 25, 2017

(30) Foreign Application Priority Data
Nov. 20, 2015 (GB) .................................. 1520474.6

(51) Int. Cl.
*B60L 53/35* (2019.01)
*B60L 53/36* (2019.01)
*B60L 53/60* (2019.01)
*B60L 53/30* (2019.01)
*G01S 19/51* (2010.01)

(52) U.S. Cl.
CPC ............. *B60L 53/35* (2019.02); *B60L 53/305* (2019.02); *B60L 53/36* (2019.02); *B60L 53/60* (2019.02); *G01S 19/51* (2013.01); *B60L 2240/622* (2013.01); *B60L 2240/72* (2013.01); *Y02T 10/7005* (2013.01); *Y02T 10/7088* (2013.01); *Y02T 10/7291* (2013.01); *Y02T 90/121* (2013.01); *Y02T 90/125* (2013.01); *Y02T 90/128* (2013.01); *Y02T 90/14* (2013.01); *Y02T 90/16* (2013.01); *Y02T 90/162* (2013.01); *Y02T 90/163* (2013.01)

(58) Field of Classification Search
None
See application file for complete search history.

(56) References Cited

U.S. PATENT DOCUMENTS

| | | |
|---|---|---|
| 6,487,500 B2 | 11/2002 | Lemelson et al. |
| 8,140,223 B2 | 3/2012 | Whitehead et al. |

(Continued)

FOREIGN PATENT DOCUMENTS

| | | |
|---|---|---|
| EP | 2772414 A2 | 9/2014 |
| WO | 2014162015 A1 | 10/2014 |

OTHER PUBLICATIONS

Great Britain Search Report for Great Britain Application No. 1520474.6 dated Apr. 11, 2016.

*Primary Examiner* — Lail A Kleinman
(74) *Attorney, Agent, or Firm* — David Kelley; Brooks Kushman P.C.

(57) ABSTRACT

A method of positioning an electric vehicle, such as a battery electric vehicle, plug-in hybrid electric vehicle, or similar vehicle relative to a charging point includes receiving at the vehicle a global positioning system (GPS) signal, receiving at the vehicle a global positioning system correction signal, correcting the global positioning system signal using the global positioning system correction signal, and positioning the vehicle relative to the charging point using the corrected global positioning system signal such that the vehicle can be charged by the charging point.

18 Claims, 2 Drawing Sheets

(56) References Cited

U.S. PATENT DOCUMENTS

| | | |
|---|---|---|
| 8,542,130 B2 | 9/2013 | Lavoie |
| 8,594,879 B2 | 11/2013 | Roberge et al. |
| 9,020,755 B1 * | 4/2015 | Gazit .................. G01S 19/41 342/357.24 |
| 2002/0084915 A1 | 7/2002 | Budnovitch |
| 2006/0235590 A1 | 10/2006 | Bolourchi et al. |
| 2012/0203410 A1 | 8/2012 | Wechlin et al. |
| 2013/0116908 A1 | 5/2013 | Oh et al. |
| 2014/0021908 A1 * | 1/2014 | McCool ............... B60L 11/182 320/108 |
| 2016/0046198 A1 * | 2/2016 | Krammer ............ B62D 15/025 701/22 |

* cited by examiner

METHOD AND SYSTEM FOR CHARGING AN ELECTRIC VEHICLE

CROSS-REFERENCE TO RELATED APPLICATIONS

This application claims foreign priority benefits under 35 U.S.C. § 119(a)-(d) to GB 1520474.6 filed Nov. 20, 2015, which is hereby incorporated by reference in its entirety.

TECHNICAL FIELD

This disclosure relates to a method of positioning an electric vehicle relative to a charging point, such as an inductive charging point, using a corrected global positioning system signal.

BACKGROUND

Electric vehicles, such as plug-in electric vehicles, plug-in hybrid electric vehicles, battery electric vehicles and range extended electric vehicles use one or more batteries to power the electric vehicle's drive train. Typically, the electric driving range of an electric vehicle can be limited by the capacity of the vehicle's batteries.

An electric vehicle can be charged by connecting it to a charging point, which may be located in or near a parking space in a parking lot. The charging point may be configured to charge the battery using one or more physical and/or wireless connections. For example, the charging point may comprise a charging lead which is plugged into the vehicle's battery system and/or an inductive charging system in which energy is transferred inductively between a charging pad and a cooperating pad on the vehicle.

In some situations it may be difficult for the driver to position the vehicle accurately relative to the charging point. If accurate alignment between the vehicle and the charging point is not achieved the vehicle's batteries may not be charged in the most efficient manner, or indeed at all.

SUMMARY

According to an aspect of the present disclosure, a method of positioning an electric vehicle relative to a charging point includes receiving at the vehicle a global positioning system signal; receiving at the vehicle a global positioning system correction signal; correcting the global positioning system signal using the global positioning system correction signal; and positioning the vehicle relative to the charging point using the corrected global positioning system signal such that the vehicle can be charged by the charging point.

The correction signal may be received from a stationary reference transmitter. The correction signal may be received via a cellular network. The correction signal may be received via a wireless internet connection. The correction signal may be received via a digital audio broadcasting signal.

The method may comprise corroborating the accuracy of the correction signal by comparing a first correction signal and a second correction signal. The first correction signal may be received from the stationary reference transmitter and/or via at least one of the cellular network, the wireless internet connection and/or the digital audio broadcasting signal. The second correction signal may be received from the stationary reference transmitter and/or via at least one of the cellular network, the wireless internet connection and/or the digital audio broadcasting signal.

The method may comprise transmitting positional data from the charging point to the vehicle. The vehicle may comprise a controller configured to determine the position of the charging point using the positional data, for example the position of the charging point relative to the vehicle. The positional data may include information regarding the position of the charging point within a town or city. The positional data may include information regarding the position of the charging point within an individual parking space. The positional data may be used to guide the vehicle to the charging point.

The method may comprise positioning the vehicle using an automatic parking assist system of the vehicle. The automatic parking assist system may be configured to maneuver the vehicle relative to the charging point and/or to provide instruction to the driver. The method may comprise positioning the vehicle relative to the charging point using the automatic parking assist system, such that the charging point and the vehicle may be operatively connected to charge the vehicle. The electric vehicle may be positioned within the range of approximately 0 to 10 cm relative to a charging portion of the charging point. The vehicle may be positioned such that an inductive coupling may be used to charge the vehicle.

According to another aspect of the present disclosure, an electric vehicle comprises a receiver system configured to receive a global positioning system signal and a global positioning system correction signal; and a controller configured to correct the global positioning system signal using the global positioning system correction signal, the corrected global positioning system signal being used to position the vehicle relative to an electric vehicle charging point such that the vehicle can be charged by the charging point.

The receiver system may comprise a first receiver configured to receive a global positioning system signal. The receiver system may comprise a second receiver configured to receive a global positioning system correction signal. The receiver system may comprise a single receiver configured to receive both of the global positioning system signal and the positioning system correction signal The electric vehicle may be configured to receive the global positioning system correction signal from the charging point. The electric vehicle may be configured to receive positional data from the charging point such that the vehicle can determine the position of the charging point. The electric vehicle may comprise an automatic parking assist system configured to position the vehicle relative to the charging point using the corrected global positioning system signal.

According to a further aspect of the present disclosure, an electric vehicle charging system comprises a receiver system provided on an electric vehicle, the receiver system being configured to receive a global positioning system signal and a global positioning system correction signal; a charging point configured to charge the electric vehicle; and a controller configured to correct the global positioning system signal using the global positioning system correction signal, the corrected global positioning system signal being used to position the electric vehicle relative to an electric vehicle charging point such that the vehicle can be charged by the charging point.

The electric vehicle charging system may comprise a stationary reference transmitter. The stationary reference transmitter may be configured to transmit the global positioning system correction signal. The charging point may comprise the stationary reference transmitter.

The disclosure also provides software, such as a computer program or a computer program product for carrying out any of the methods described herein, and a computer readable medium having stored thereon a program for carrying out any of the methods described herein. A computer program embodying the disclosure may be stored on a computer-readable medium, or it could, for example, be in the form of a signal such as a downloadable data signal provided from an Internet website, or it could be in any other form.

To avoid unnecessary duplication of effort and repetition of text in the specification, certain features are described in relation to only one or several aspects or arrangements of the disclosure. However, it is to be understood that, where it is technically possible, features described in relation to any aspect or arrangement of the disclosure may also be used with any other aspect or arrangement of the disclosure.

For a better understanding of the present disclosure, and to show more clearly how it may be carried into effect, reference will now be made, by way of example, to the accompanying drawings, in which:

DETAILED DESCRIPTION

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

A global positioning system (GPS) navigation device can be used to direct a driver to one or more locations. Since the driving range of a vehicle is limited by the amount of fuel it can carry on board, it is known for the driver to use the GPS device to locate a refueling location. In particular, the electric driving range of an electric vehicle is limited by the capacity of the batteries used to power the electric propulsion system of the vehicle. As such, it is becoming increasingly important to be able to locate accurately electric charging stations. However, the positional accuracy of a standard GPS navigational system is typically limited to a range of approximately 10 to 15 m.

A differential global positioning system (DGPS) is an enhancement to a standard GPS system, and can improve the positional accuracy of navigational instructions to about 10 cm, or within the range 2-3 cm, depending on the configuration of the DGPS system. The DGPS system uses a network of fixed, ground based reference stations that broadcast the difference between the positions indicated by the GPS satellite and the known fixed positions of the reference station. In this manner, the DGPS reference station is able to broadcast a correction signal that can be used to improve the positional accuracy of the standard GPS signal.

Figure 1:
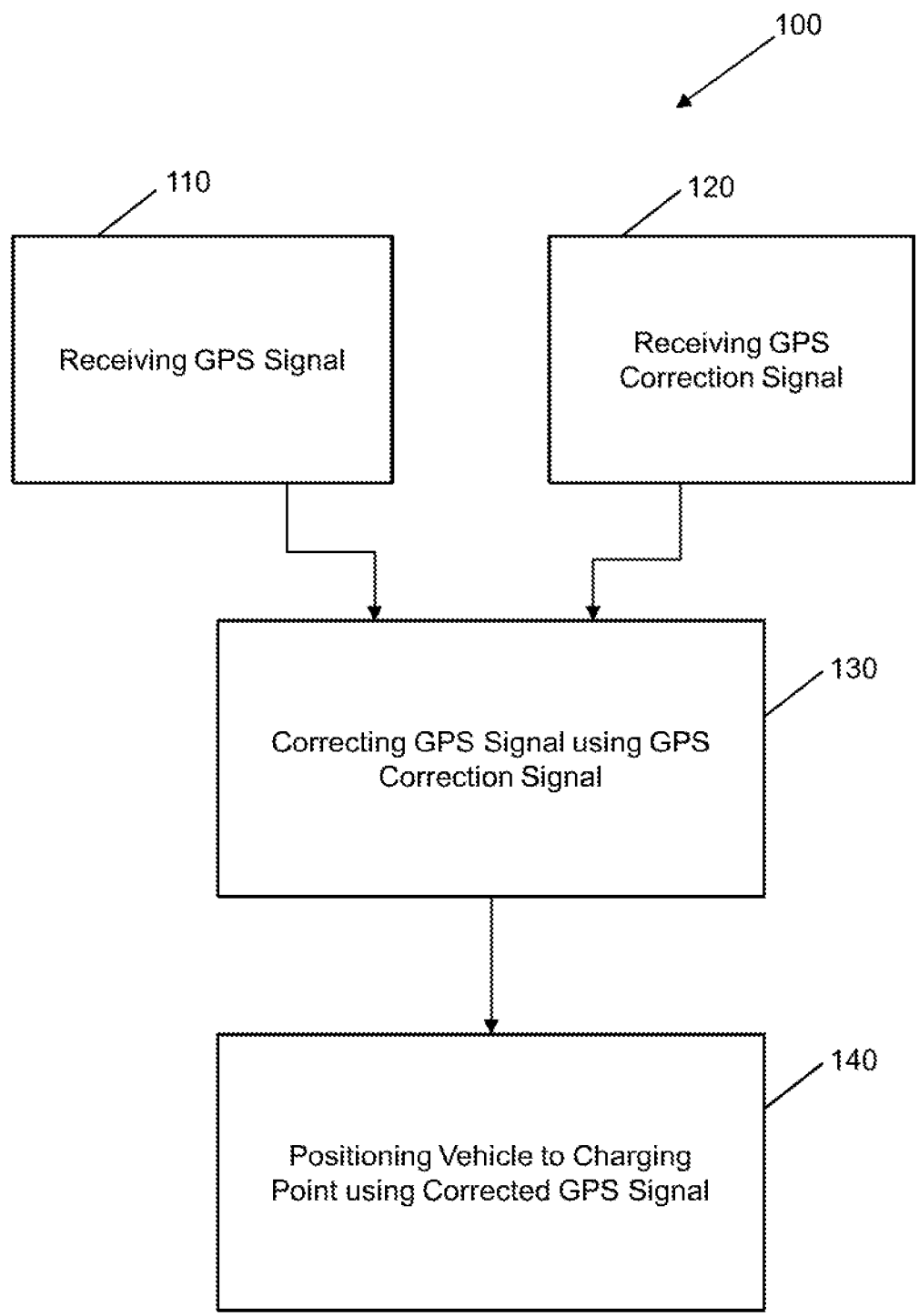
FIG. 1 depicts a method of positioning an electric vehicle relative to a charging point.
Figure 2:
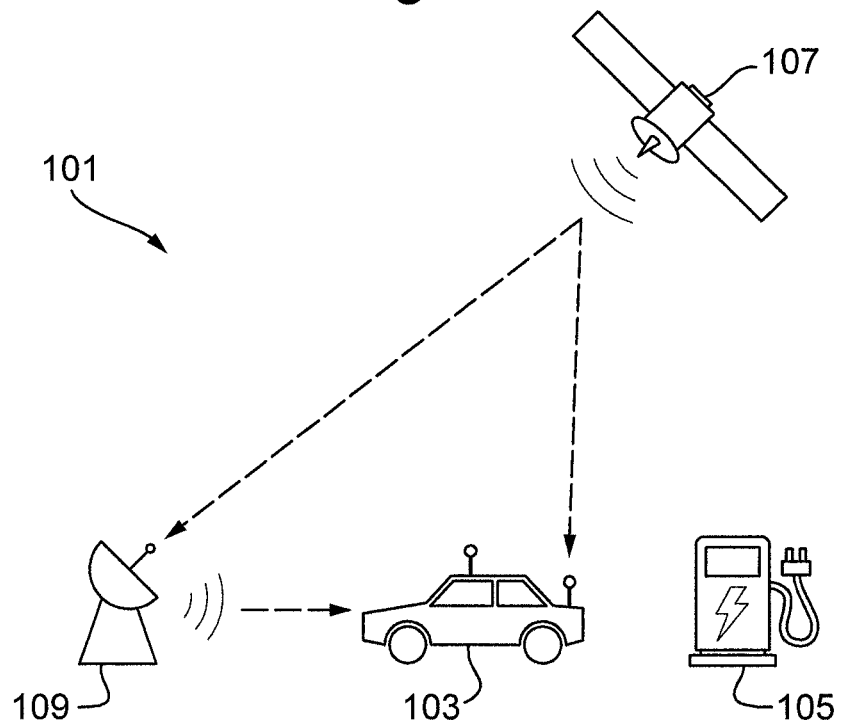
FIG. 2 shows a system for charging an electric vehicle.
Figure 3:
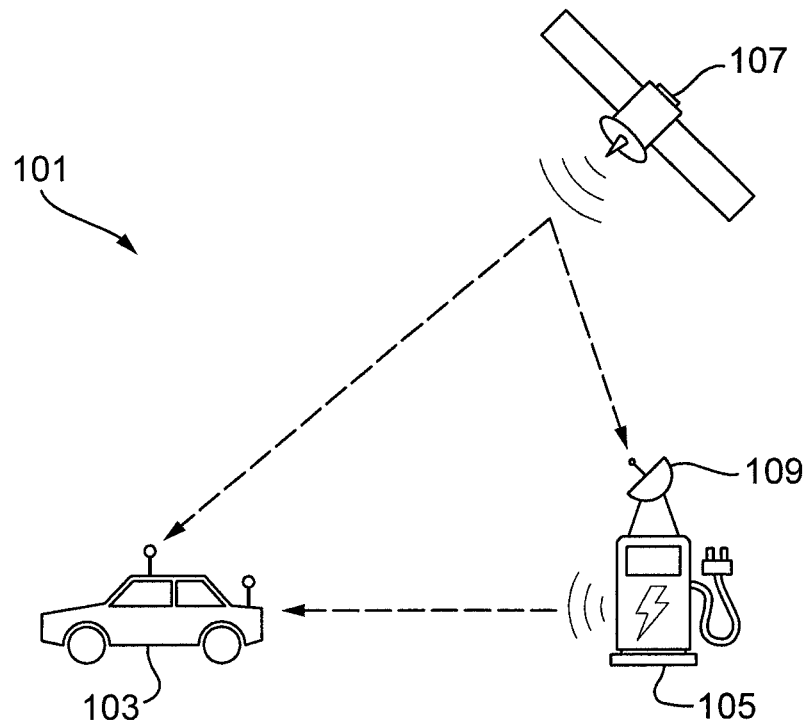
FIG. 3 shows another system for charging an electric vehicle.

FIGS. 1 to 3 depict a method 100 and a system 101 for positioning an electric vehicle 103 relative to a charging point 105. In the context of the present disclosure, the term "electric vehicle" is understood to mean any vehicle comprising one or more electric systems. For example, the electric vehicle may be a plug-in electric vehicle (PEV), a plug-in hybrid electric vehicle (PHEV), a battery electric vehicle (BEV), a range-extended electric vehicle (REV), or any other vehicle comprising a battery-powered electrical system. The electrical system may be a propulsion system of the vehicle, for example the electric system may comprise one or more batteries that are configured to power an electric motor of the vehicle. However, the electric system may be one or more ancillary systems of the vehicle, for example an electric motor-generator.

The method 100 comprises a step 110 of receiving a GPS signal using a first receiver of the vehicle 103. In FIGS. 2 and 3, the GPS signal is transmitted from a satellite 107 to the receiver of the electric vehicle 103. However the GPS signal may be transmitted by virtue of any appropriate transmitting means, for example using a GPS transmitter positioned at ground level (as opposed to in the earth's orbit), a cellular network, a wireless internet connection and/or a digital audio broadcasting (DAB) signal.

The method 100 comprises a step 120 of receiving a GPS correction signal using a second receiver of the electric vehicle 103. However, the GPS signal and the GPS correction signal may be received by the same receiver. In the arrangement shown in FIGS. 2 and 3, the GPS correction signal is received from a stationary reference transmitter 109. However, in addition to or instead of receiving the GPS correction signal from the stationary reference transmitter 109, the GPS correction signal may be received via a cellular network, via a wireless internet connection and/or via a DAB signal. For example, the electric vehicle 103 may be configured to connect to a global system for mobile communications (GSM) and/or may be a connected vehicle that is equipped with a wireless local area network. In this manner, the electric vehicle 103 is able to share internet access with one or more other devices, for example another vehicle and/or a central server for the purposes of obtaining the GPS correction signal.

Where the electric vehicle 103 is fitted with a DAB system, the DAB system may be configured to receive a DAB data transmission on any channel that is suitable for carrying DGPS data. The DGPS data may be transmitted on a channel also containing data with regards to music for example. This allows flexible usage of an existing DAB system of the vehicle.

The method 100 comprises the step 130 of correcting the GPS signal using the GPS correction signal. The correction of the GPS signal may be carried out by a controller of the electric vehicle 103, for example by one or more existing electronic control units (ECU) of the electric vehicle 103. Additionally or alternatively, the controller may be an aftermarket controller fitted to the vehicle 103 for the purposes of correcting the GPS signal using the GPS correction signal. In this manner, the position of the electric vehicle 103 may be determined within an accuracy of approximately 10 cm.

In the arrangement shown in FIG. 2 the GPS stationary reference transmitter 109 is remote from the vehicle 103 and the charging point 105. For example, the stationary reference transmitter 109 may be positioned up to approximately 500 km from the electric vehicle 103 and/or the charging point.

In order to ensure that the corrected GPS signal is accurate, the method 100 may further comprise a step of corroborating the accuracy of the correction signal to ensure that errors in the transmission of differential corrections calculated by the stationary reference transmitter 109 are minimized. For example, the method may comprise a step of comparing a first correction signal received from the stationary reference transmitter 109 and a second correction signal received from another stationary reference transmitter and/or via at least one of the cellular network, the wireless internet connection and the DAB signal. In this manner, the electric vehicle charging system 101 can determine if there is any discrepancy between the first correction signal and the second correction signal. Where there is a determined discrepancy between the first and second correction signals, a controller of the electric vehicle charging system 101 may be configured to request one or more additional correction signals from at least one of another stationary reference transmitter, and/or via at least one of the cellular network, the wireless internet connection and the DAB signal.

Once the GPS signal has been corrected using the GPS correction signal, the electric vehicle 103 can be positioned relative to the charging point using the corrected GPS signal, such that the electric vehicle 103 can be charged by the charging point 105. It is important to use a corrected GPS signal when performing step 140 of positioning the electric vehicle 103 relative to the charging point 105 as misalignment between respective portions of the electric vehicle 103 and the charging point 105 can result in a loss of energy transfer efficiency, or the electric vehicle 103 and the charging point 105 not being able to connect electrically at all. While a positional accuracy, for example within 10 cm, may not be so important when an operator manually connects a cable from the charging point to the electric vehicle 103, the positional accuracy of the electric vehicle 103 relative to the charging point 105 is important for modern charging systems.

Where the charging point 105 comprises an inductive charging system it is difficult for a driver of the vehicle 103 to accurately maneuver and position the vehicle 103 over an inductive charging coil, especially as it is common for the charging coils to be positioned on the ground and hence underneath the vehicle 103 when the vehicle 103 approaches the charging coil. If accurate alignment is not achieved between the charging coil of the charging point 105 and the corresponding coil on the electric vehicle 103, there may be significant energy losses in the transfer of energy between the two inductive coils, for example due to a large air gap. Such energy losses may lead to an increased cost of charging the battery system of the electric vehicle 103, and/or an increased charging time due to the decreased charging efficiency.

Additionally or alternatively, the charging point 105 may comprise a robotic system configured to position a portion of the charging point relative to the electric vehicle 103. For example, the charging point 105 may comprise a robotic arm that extends from the charging point 105 to couple a charging cable to a connector on the electric vehicle 103. Any misalignment, therefore, between the electrical connector on the electric vehicle 103 and the robotic arm of the charging point 105 may result in the cable of the charging point 105 not being connected to the electrical connector of the electric vehicle 103. It is advantageous therefore to provide a system 101 and method 100 for accurately positioning the electric vehicle 103 relative to the charging point 105, for example within the range of approximately 2 to 10 cm, so that the electric vehicle 103 may be charged in the most efficient manner by the charging point 105.

Typically, data regarding the position of the charging point 105 is loaded into the GPS navigation system of the electric vehicle 103, such that the position of the electric vehicle 103 may be compared to that of the charging point 105. However, the position of the charging point 105 may not have been uploaded to the GPS navigation system of the electric vehicle 103. Even where the position of the charging point 105 has been uploaded to the navigation system of the electric vehicle 103, the position of the charging point 105 may have moved since the positional data was uploaded to the electric vehicle's navigational system. The method 100 may further comprise a step of transmitting positional data from the charging point 105 to the electric vehicle 103, such that the vehicle 103 can determine the position of the charging point 105. For example, the charging point 105 may transmit a set of coordinates that locate the charging point 105 on a map relative to the electric vehicle 103. In this manner, it is not necessary to update the navigational system of the electric vehicle 103 whenever a new charging point is provided, and/or an existing charging point 105 is moved. The step of transmitting positional data from the charging point may be of particular advantage if the charging point 105 is a mobile charging point.

As discussed above, it can be difficult for a driver to position the vehicle 103 accurately relative to the charging point 105, especially if the charging point 105 is obscured from view of the driver of the vehicle 103. The method 100 may comprise positioning the electric vehicle 103 using an automated parking system of the electric vehicle 103. For example, the corrected GPS signal may be used by the automated parking system to position the vehicle 103 relative to the charging point 105. In this manner, the vehicle 103 may be positioned automatically, or at least partially automatically, in order to achieve accurate alignment between the charging connector of the electric vehicle and the charging point 105.

Referring to FIG. 2, the stationary reference transmitter 109 is configured to receive a GPS signal from the satellite 107. The stationary reference transmitter 109 then performs differential calculations over a period of time, for example 20 minutes or longer, in order to calculate the differential corrections for its own location and time. The stationary reference transmitter 109 is then able to transmit a GPS correction signal to the electric vehicle 103, one or more other vehicles, and/or a central server. Where the stationary reference transmitter 109 transmits the corrected GPS signal to a central server, the central server may be configured to transmit the correction signal to the electric vehicle 103 via the cellular network, the wireless internet connection and/or via a DAB signal. In this manner, the electric vehicle 103 need not be configured to receive the corrected signal directly from the stationary reference transmitter 109, instead receiving the corrected GPS signal via an intermediary transmission.

The central server may be located near the charging point 105, and/or may be provided as part of the charging point 105. In this manner, the GPS navigation system of the electric vehicle 103 may be used to direct the vehicle to the vicinity, for example within 10 m, of the charging point 105, and then the corrected GPS signal may be used to accurately position the electric vehicle 103 relative to a portion of the charging point 105, for example within 2 to 10 cm of a portion of the charging point. Such a set-up may be particularly advantageous in a car parking lot comprising a plurality of charging points. For example, as the electric vehicle 103 approaches the parking lot the corrected GPS signal may be received by the electric vehicle 103 and the automated parking system may be used to position the vehicle 103 relative to a portion of the charging point 105.

The electric vehicle charging system 101 may be configured such that the corrected GPS signal is not continually received by the electric vehicle 103, instead only being received once the electric vehicle 103 is in the vicinity of the charging point 105. FIG. 3 shows another arrangement of the electric vehicle charging system 101 in which the charging point 105 comprises the stationary reference transmitter 109. In the arrangement shown in FIG. 3, both the electric vehicle 103 and the charging point 105 are configured to receive the global positioning system signal from the satellite 107. The charging point 105 is configured to transmit the GPS correction signal that has been computed by the stationary reference transmitter 109. The charging point 105 may also be configured to transmit data regarding its own position, for example its position relative to the vehicle 103 and/or in relation to highway infrastructure. The electric vehicle 103 is configured to receive the GPS correction signal from the charging point 105 and use the GPS correction signal to correct the GPS signal received from the satellite 107. The present disclosure therefore provides an electric vehicle charging system 101 configured to correct a GPS signal and position the vehicle 103 relative to the charging point 105 using the corrected GPS signal.

It will be appreciated by those skilled in the art that although the disclosure has been described by way of example with reference to one or more arrangements, it is not limited to the disclosed arrangements and that alternative arrangements could be constructed without departing from the scope of the disclosure as defined by the appended claims.

While representative embodiments are described above, it is not intended that these embodiments describe all possible forms of the claimed subject matter. The words used in the specification are words of description rather than limitation, and it is understood that various changes may be made without departing from the spirit and scope of the disclosure. Additionally, the features of various implementing embodiments may be combined to form further embodiments of the invention.

What is claimed is:

1. A method of positioning an electric vehicle relative to a charging point, comprising:
   receiving at the vehicle, a global positioning system (GPS) signal and a GPS correction signal;
   correcting the GPS signal using the GPS correction signal;
   positioning the vehicle relative to the charging point using the GPS signal; and
   responsive to the vehicle being within a threshold vicinity of the charging point, docking the vehicle at the charging point using the GPS correction signal.

2. The method of claim 1 wherein the GPS correction signal is received from a stationary reference transmitter.

3. The method of claim 1 wherein the GPS correction signal is received from a cellular network.

4. The method of claim 1 wherein the GPS correction signal is received from a digital audio broadcasting signal.

5. The method of claim 1 further comprising corroborating accuracy of the GPS correction signal by comparing a first GPS correction signal and a second GPS correction signal.

6. The method of claim 1 further comprising receiving at the vehicle positional data regarding position of the charging point such that the vehicle can determine the position of the charging point.

7. The method of claim 6 wherein the positional data is transmitted from the charging point.

8. The method of claim 1 wherein the docking the vehicle further includes positioning the vehicle using an automatic parking assist system of the vehicle.

9. The method of claim 1 wherein the GPS correction signal enables the vehicle to be positioned within a range of approximately 10 cm relative to the charging point.

10. An electric vehicle comprising:
    a receiver system configured to receive a global positioning system (GPS) signal and a GPS correction signal; and
    a controller configured to (i) drive a vehicle to a charging point using the GPS signal, and responsive to the vehicle being within a threshold vicinity of the charging point, (ii) dock the vehicle at the charging point using the GPS signal corrected by the GPS correction signal.

11. The electric vehicle of claim 10 wherein the electric vehicle is configured to receive the GPS correction signal from the charging point.

12. The electric vehicle of claim 10 wherein the electric vehicle is configured to receive positional data of the charging point.

13. An electric vehicle charging system comprising:
    a receiver system provided on an electric vehicle, the receiver system being configured to receive a global positioning system (GPS) signal and a GPS correction signal;
    a charging point configured to charge the electric vehicle; and
    a controller configured to (i) drive a vehicle to the charging point using the GPS signal, and responsive to the vehicle being within a threshold vicinity of the charging point, (ii) dock the vehicle at the charging point using the GPS signal corrected by the GPS correction signal.

14. The electric vehicle charging system of claim 13 further comprising a stationary reference transmitter configured to transmit the GPS correction signal.

15. The electric vehicle charging system of claim 14, wherein the charging point comprises the stationary reference transmitter.

16. The electric vehicle charging system of claim 14 wherein the GPS correction signal is received from a cellular network.

17. The electric vehicle charging system of claim 14 wherein the controller comprises a vehicle computing system.

18. The electric vehicle charging system of claim 14 wherein the charging point transmits the GPS correction signal for use by the electric vehicle.

* * * * *